United States Patent [19]
Czyzewski et al.

[11] Patent Number: 5,691,924
[45] Date of Patent: Nov. 25, 1997

[54] NARROW BAND SPECTRUM ANALYSIS METHOD AND APPARATUS

[75] Inventors: Zbigniew Czyzewski; Ronald G. Canada, both of Knoxville, Tenn.

[73] Assignee: Computational Systems, Inc., Knoxville, Tenn.

[21] Appl. No.: 508,851

[22] Filed: Jul. 28, 1995

Related U.S. Application Data

[63] Continuation-in-part of Ser. No. 355,208, Dec. 9, 1994.
[51] Int. Cl.$^6$ .................................................. G01R 23/00
[52] U.S. Cl. ........................... 364/576; 364/508; 364/485
[58] Field of Search ............................... 364/576, 484, 364/485, 487, 572, 577, 508; 324/76.19–76.38

[56] References Cited

U.S. PATENT DOCUMENTS

| | | | |
|---|---|---|---|
| 3,634,760 | 1/1972 | Murtin | 324/77 R |
| 3,691,394 | 9/1972 | Davis | 307/3 |
| 4,054,785 | 10/1977 | Lehmann | 364/726 |
| 4,520,674 | 6/1985 | Canada et al. | |
| 4,810,960 | 3/1989 | Owen et al. | 324/79 X |
| 4,862,407 | 8/1989 | Fette et al. | |
| 4,885,707 | 12/1989 | Nichol et al. | |
| 4,929,874 | 5/1990 | Mizuno et al. | |
| 5,255,565 | 10/1993 | Judd et al. | |

OTHER PUBLICATIONS

Alan V. Oppenheim et al., "Signal and Systems", 1983, pp. 19 and 459–461.
DSP–Motorola Digital Signal Processors: Principles of Sigma–Delta Modulation for Analog–to–Digital Converters, by Sangil Park, Ph.D., Strategic Applications, Digital Signal Processor Operation, Phoenix, Arizona (Apr. 1993).

*Primary Examiner*—James P. Trammell
*Attorney, Agent, or Firm*—Luedeka, Neely & Graham, P.C.

[57] ABSTRACT

A zoom processor for increasing the resolution of a band of interest within an acquired analog time domain frequency signal. The signal is converted from an analog time domain signal to a digital time domain signal. Next, the signal is multiplied by a value which will lower the center frequency of the band of interest to zero. The value by which the signal is multiplied is based on both the sine and cosine of a function of the center frequency and the sampling frequency used to digitize the signal. The sine function is solved with the aid of a numerical substitution which simplifies finding the value of the function in a sine table. After the signal is shifted, it is low-pass filtered, which removes all of the signal except the band of interest. During filtering, the band is also decimated by a predetermined factor, which compresses the time domain signal, and proportionally expands the frequency domain signal which is produced at a later step of the method. A transform, such as a Fast Fourier Transform, is performed on the band, to convert the signal from time domain to frequency domain. The signal is analyzed according to the ultimate function of the instrument in which the zoom processor is incorporated.

8 Claims, 2 Drawing Sheets

NARROW BAND SPECTRUM ANALYSIS METHOD AND APPARATUS

FIELD OF THE INVENTION

This invention relates to the field of digital frequency analysis, and more particularly to the field of vibration analysis. This application is a continuation-in-part of application Ser. No. 08/355,208, filed Dec. 9, 1994, the disclosure of which is incorporated herein by reference.

BACKGROUND OF THE INVENTION

Vibration detection and analysis instruments are used to detect problems with various types of rotating equipment, over a wide range of rotational speeds. If, for example, the instrument is used to analyze a gear box, it might detect a problem such as chipped or cracked gear teeth. If used to analyze rotor equipment such as fans, motors, turbines, and the like, the instrument might detect a rotor unbalance condition, or worn bearings.

The vibration detection instrument must be sensitive to a broad range of vibration frequencies to analyze and diagnose problems on a wide range of equipment. However, the frequency band of interest for these various problems will be at different locations within the detectable frequency range, depending on the equipment being tested, and the problem being analyzed.

For example, one condition may require analysis of vibration at 40 kHz, while another condition may require analysis of vibration at 10 kHz. Thus, the center frequency of the band of interest is variable. In addition, two conditions which require analysis of vibration at 20 kHz may require analysis over different band widths. For example, the first condition may require analysis of vibration frequencies from 15 kHz to 25 kHz, and the second condition may only require analysis of vibration frequencies from 19.5 kHz to 20.5 kHz. Thus, both the center and width of the band of interest is of importance in analyzing vibration problems.

The frequency components of the vibration spectrum that are outside of the band of interest are not used during a specific analysis, yet these components consume some, and at times a great portion of the resources of the vibration detection instrument, reducing the resolution of the band of interest. Zoom processing enhances the resolution of a narrow frequency band within the detectable frequency range of the instrument. Zoom processing of a specific band focuses the resolution of the instrument on the band of interest, instead of spreading the resolution throughout the entire detectable frequency range.

Zoom processing typically requires a bank of band-pass filter sets. These filters may be either hardware filters, or filter parameters stored in a memory and implemented in software by a processor. Each filter set contains one band-pass filter or one low-pass filter and one high-pass filter. The high-pass filter operates at a lower frequency than the low-pass filter. Thus, when the filter set is used on a signal, regardless of whether the filter set is implemented in hardware or software, the only portion of the signal which remains is the band of frequencies between the value of the high-pass filter at the low end, and the value of the low-pass filter on the high end.

The value of the low-pass and high-pass filters in each set of band-pass filters provided will determine the center frequency and band-width of the frequency band to be zoom processed. Many filter sets are needed to provide adequate versatility in selection of the center and width of the frequency band of interest. For example, if ten different center frequencies are required, and ten different band-widths are required for each center frequency, then 100 different band-pass filter sets are required.

The optimal condition is to provide center frequencies and band-widths which are continuously variable, and operator selectable, over the entire detectable range of the instrument. This, however, would require a traditional frequency analyzer to provide an infinite number of band-pass filter sets. If the band-pass filters are stored as parameters in software, the instrument requires sufficient additional memory to hold them. If the band-pass filters are implemented in hardware, the instrument requires additional space and power to accommodate the circuitry. In either case, the banks of band-pass filters necessitate a larger, heavier instrument with greater power requirements.

The space and power requirements of the band-pass filter sets have traditionally limited the use of zoom processing to relatively large, immobile analytical instruments, which have both the size needed to contain the additional circuitry, and a sufficient power source. Typically this will involve a stationary power supply, such as a standard electrical wall outlet, thereby limiting the instrument's spatial range of use.

As a method of reducing the size and power requirements, some instruments provide zoom processing within just a few discrete frequency bands. This reduced versatility requires fewer band-pass filter sets, but precludes using the instrument to analyze problems which create vibration outside of the few frequency bands offered.

What is needed is a method of zoom processing that is continuously selectable over the entire range of frequencies detectable by the instrument, and provides a sufficient number of band-widths over this range.

SUMMARY OF THE INVENTION

These and other needs are met by a method of zoom processing a time domain frequency signal, which has been digitized at a sampling frequency. A zoom processor is provided, which has an input device, a memory, a processor, and an output device. The digitized time domain frequency signal is acquired with the input device of the zoom processor, producing an acquired signal.

The frequency of the acquired signal is lowered, such that the center frequency of the band of interest is shifted to a frequency of zero. Shifting the frequency of the acquired signal makes subsequent processing of the signal faster and easier. The processor of the zoom processor is used to lower the frequency of the acquired signal by multiplying the acquired signal by $\{\cos[(2\pi)\eta(f_c/f_s)]+j^*\sin[(2\pi)\eta(f_c/f_s)]\}$, where $\eta$ is a consecutive data point number, $j$ is an imaginary number having a value of $(-1)^{1/2}$, $f_c$ is a frequency of the signal, and $f_s$ is the sampling frequency used to produce the digitized time domain frequency signal. A shifted signal is produced.

The shifted signal is low-pass filtered to produce a low-pass filtered signal. Low-pass filtering of the shifted signal removes those frequency components of the shifted signal that are not within the band of interest. In a preferred embodiment the low-pass filtered signal is decimated by a predetermined factor to produce a decimated signal. The decimated signal is output as a zoom processed signal with the output device of the zoom processor.

In a preferred embodiment, the above equation is solved with the aid of a sine table, which is input into the zoom processor using the input device, and stored in the memory of the zoom processor. The value of each entry in the sine table is based on one full period being represented by a predetermined number of entries, stored with twenty-four bit precision. To simplify the process of solving the above equation, $f_c/f_s$ is represented by the expression $(X+\Delta)/\Psi$, where X is a positive integer less than or equal to 800, $\Psi$ is the predetermined number mentioned above, and $\Delta$ is a non-negative number less than one. The processor of the zoom processor is used to solve the expression for X and $\Delta$, within the boundaries of the aforementioned constraints.

The values of X and $\Delta$ are used to solve the signal-shifting equation in the following manner. When $\Delta$ equals zero, every Xth entry in the sine table is selected for a stream of data points by the processor of the zoom processor, and the value of each $\eta$th selected entry equals $\sin[(2\pi)\eta(f_c/f_s)]$. When $\Delta$ does not equal zero, the processor of the zoom processor uses $\Delta$ to interpolate between the $\eta X$ sine table entry and $\eta(X+1)$ sine table entry to determine an interpolated value which equals $\sin[(2\pi)\eta(f_c/f_s)]$. The value of $\cos[(2\pi)\eta(f_c/f_s)]$ is calculated by the processor of the zoom processor using the sine table and the equation $\cos(\theta)=\sin(\theta+\pi/2)$. In a most preferred embodiment, the predetermined number $\Psi$ is 2048.

The shifted signal is preferably filtered with sixth order elliptical low-pass filters that are stored in the memory of the zoom processor. The filters are stored with twenty-four bit precision. The upper cutoff frequency of the low-pass filters is $(f_u-f_l)/2$, where $f_u$ is a frequency higher than $f_c$, and $f_l$ is a frequency lower than $f_c$, and $f_u$ and $f_l$ are equidistant from $f_c$. The filtering also preferably decimates the low-pass filtered signal by a predetermined factor, which factor is between eight and 800. In a preferred embodiment, $f_u$ is less than $f_s/2.56$.

BRIEF DESCRIPTION OF DRAWINGS

The present invention is best understood by reference to the detailed description of preferred embodiments when considered in conjunction with the following drawings, in which.

DETAILED DESCRIPTION OF THE INVENTION

Figure 1:
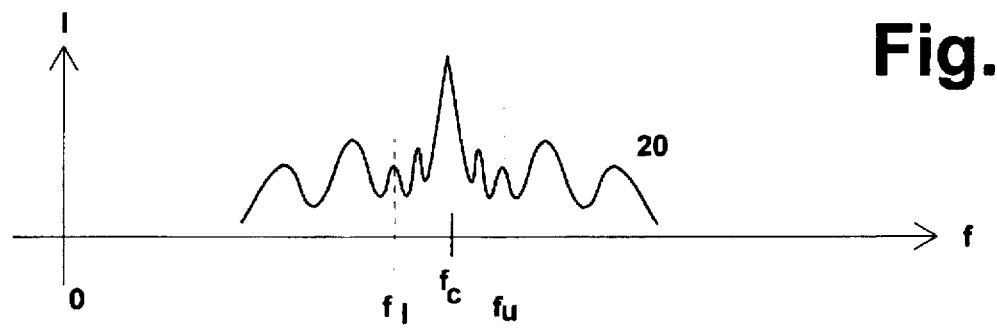
FIG. 1 is a plot of an acquired signal showing frequency versus amplitude.

Referring now to the drawings in which like reference characters designate like or corresponding parts throughout the several views, there is shown in FIG. 1 an acquired frequency signal 20, such as might be produced by equipment vibration. While the signal 20 depicted is a symmetrical signal, it is noted that a symmetrical signal is not essential to implement the method of the present invention, and most signals 20 so processed are not symmetrical. The signal 20 is acquired as an analog signal of frequency and amplitude versus time, or in other words, an analog time domain signal.

Because much of the present invention relates to manipulation of the frequency of the signal 20, the plots of the signal 20 in the various figures are shown as frequency versus amplitude, which simplifies the explanation of the methods of the invention. In other words, the steps of the method are explained and depicted in terms of their effect on a frequency domain signal, even though the signal 20 may still be in time domain when the steps are performed.

Figure 5:
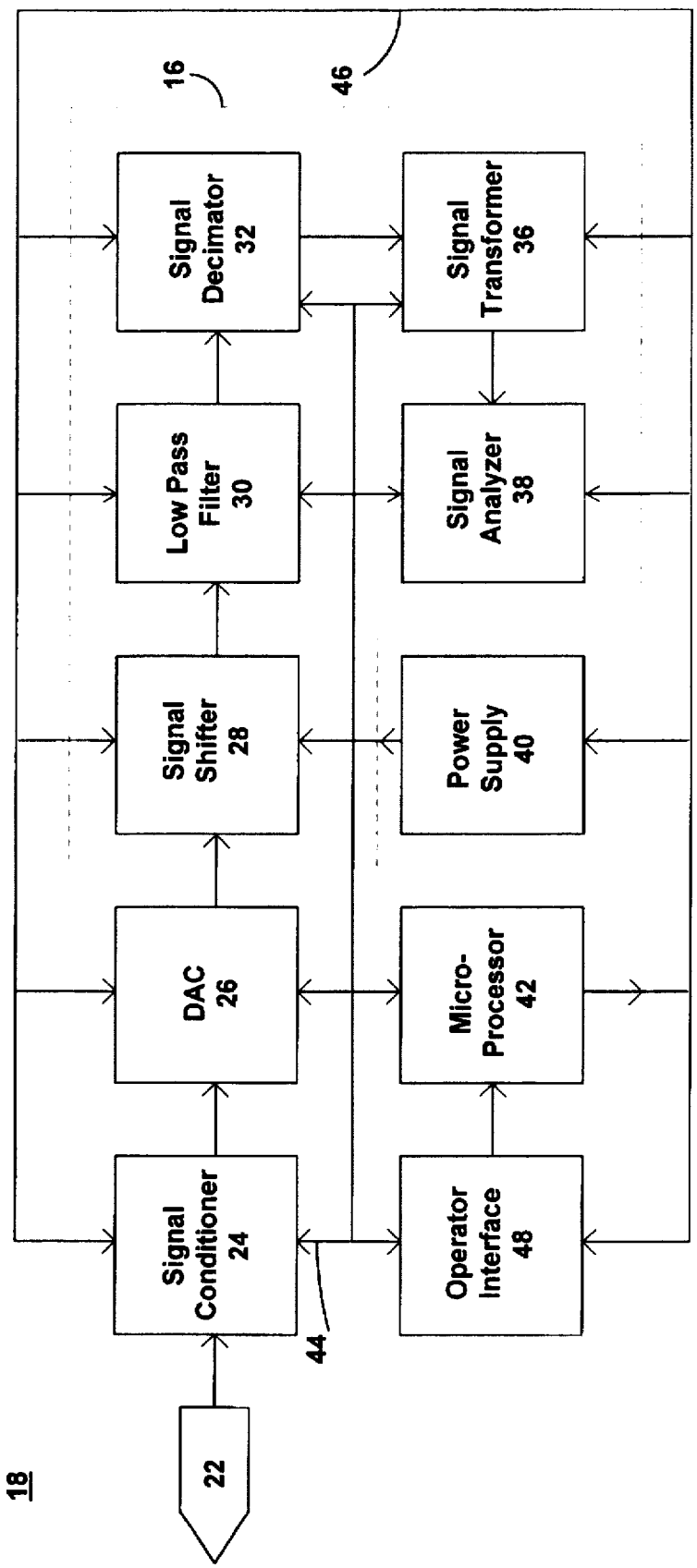
FIG. 5 is a functional block diagram of an instrument incorporating the zoom processor of the present invention.

Referring now to FIG. 5, there is illustrated a functional block diagram of an instrument 18 implementing zoom processing according to the present invention. The signal 20 is acquired by a vibration sensor, such as sensor 22. In the preferred embodiment, the signal 20 is conditioned by signal conditioner 24, to prepare it for the steps to follow. Signal conditioning includes such steps as amplification, filtering, and DC offset, if needed. The filtering preferably includes an analog low pass filter, which is set at a fixed frequency equal to the highest frequency of interest detectable by the instrument. Low pass filtering of the signal 20 at this point prevents frequency aliasing during subsequent analog to digital conversion of the signal 20.

The signal 20 is input to the zoom processor 18 by means of an input device, which can be as simple as a mere physical connection to other components for a zoom processor 18 which is integrated into an instrument having other functions available, or may include the vibration sensor 22, signal conditioner 24, and digital to analog converter 26 if the zoom processor 18 is more of a stand-alone device.

The signal 20 is digitized, preferably by an oversampling sigma-delta analog to digital converter 26, which, in conjunction with the analog low-pass filter of the signal conditioner 24, prevents signal aliasing. In the preferred embodiment, the sampling frequency, $f_s$, is set at a predetermined value, according to criteria more fully explained hereafter. The sampling frequency is chosen automatically after the operator specifies the frequency band of interest.

The memory 16 is RAM or other volatile memory, or registers in which the data of the signal 20 may temporarily reside. Zoom processing could be implemented, in an alternate embodiment, by storing the entire signal 20 in memory 16 before zoom processing occurs, which method is impractical for some applications. In the preferred embodiment, each data point of the signal is processed as it is acquired, and so each point need not be stored in any one memory location for any length of time, and new points are written in as old points are read out, thereby reducing the memory size requirements. In other words, the zoom processing is preferably conducted in real time.

As depicted in FIG. 1, the signal 20 extends from a low frequency to a high frequency, with varying amplitudes at each frequency along the spectrum. The amplitude of the signal 20 at any given frequency is an indication of a magnitude, such as acceleration, velocity, or displacement, which characterize the vibration of the equipment at that frequency being analyzed by the instrument. The high and low frequency limits detectable by the instrument can extend from a low of zero Hz to a high limit bounded by the sensitivity of the instrument. In the preferred embodiment, the instrument acquires a signal 20 from thirty Hz to forty kHz, which is sufficient for the analysis of most vibration related problems, but the invention is suitable for use in instruments having a larger or smaller frequency range as well.

While an instrument may have the capability to acquire a signal 20 within this broad a range, a range as great as this is not often required in the diagnosis of a specific problem. For example, a first problem may exhibit symptoms of vibration only at a very low frequency, a second may exhibit vibration only at a very high frequency, and yet a third only at a narrow band of frequency intermediate the other two. Thus, while it is of great benefit to have an instrument which is sensitive to a broad range of frequencies, so that only the single instrument is required to diagnose any one of the three problems mentioned above, the entire frequency spectrum to which the instrument is sensitive is not often required during a single analysis procedure.

Typically, only a specific frequency band is of interest for analysis, and use of the limited storage and processing resources of the instrument is wasted if used on the portions of the signal 20 which are outside of the band of interest. Thus zoom processing as described below is employed to discard the unwanted portions of the signal 20, enhance the resolution of the band of interest, and efficiently determine the frequency spectrum in the band of interest.

In the preferred method, the center of the specific frequency range of interest is determined. As depicted in FIG. 1, this narrow spectrum band has a lower frequency boundary of $f_l$, a center frequency of $f_c$, and an upper frequency boundary of $f_u$. The frequency $f_c$ is input by use of the operator interface 48, depicted in FIG. 5.

The width of the band of interest is also input by use of the operator interface 48. The width of the band of interest is any width which does not exceed the range of the instrument used. In the preferred embodiment the width is any one of several different widths, as described more completely hereafter. The zoom processor calculates the upper frequency and the lower frequency using the center frequency and the width of the band of interest as input by the operator.

It is noted that the present invention allows the operator to choose the center frequency and width of the band anywhere within the frequency sensitivity range of the instrument. In the preferred embodiment the upper frequency is less than the sampling frequency $f_s$ divided by 2.56. The relationship between the upper frequency and the sampling frequency is preferably set so as to provide a sampling rate great enough to prevent signal aliasing during the digitizing process. Thus, the zoom processor preferably chooses a sampling frequency that will support the constraints of the desired upper frequency as explained above.

The frequency at the center of the band of interest, $f_c$, is shifted to zero. The shift is preferably accomplished by multiplying the acquired signal 20 by $\exp[j(2\pi)\eta(f_c/f_s)]$, where $\eta$ is a consecutive data point number assigned to the data of the signal 20 as it is acquired, and $j$ is an imaginary number equal to $(-1)^{1/2}$. The value of $\eta$ begins at zero for the first data point of the digitized acquired signal 20. For each successive data point, the value of $\eta$ associated with that data point is incremented by one.

Multiplying the acquired signal 20 by this expression shifts the entire acquired signal 20 down by the value of $f_c$. In other words, $f_c$ is shifted down from its original frequency to zero. For example, if $f_c$ is ten kHz prior to the shift, frequencies of five kHz and fifteen kHz are moved to negative five kHz and five kHz respectively during the shift, and $f_c$ is moved to zero.

The time required for the calculations is reduced in the preferred embodiment by substituting $\cos[(2\pi)\eta(f_c/f_s)]+ j*\sin[(2\pi)\eta(f_c/f_s)]$ for $\exp[j(2\pi)\eta(f_c/f_s)]$, where the trigonometric expressions are in radians. The trigonometric functions, when performed in the manner explained below, require fewer processor cycles, and thus less time to accomplish than the exponential function. The benefit of the substitution is further enhanced in the preferred embodiment by providing a table of sine values, so that the sine function is not recalculated with each computation, and is determined in less time. The sine table is also input to the zoom processor 18 via the interface 48, and stored in memory 16.

Performing the calculations in as little time as possible is of great importance, as the calculations for each data point of the acquired signal 20 are performed as each data point is acquired, and are preferably completed before the next data point is acquired, so that the instrument does not miss any data because of an inability to perform the calculations in a timely manner. The time allotted to perform the calculations decreases as the frequency of $f_c$ increases, because the sampling frequency preferably increases, so as to accurately digitize the analog signal 20. Thus, reducing the time required for the necessary calculations allows for a higher sampling frequency to be used, and, therefore, a higher center frequency for the band of interest.

The full sine table is preferably based on a predetermined number of entries, representing one complete period. The predetermined number of entries in the full table is selected after balancing the competing interests of a fast calculation and the degree of precision against low instrument power consumption and small instrument size, as explained in more detail below.

A table with a greater number of entries reduces the need to interpolate between two entries to determine a desired value, thus decreasing the time required to perform the calculations and providing better precision. However, a table with fewer entries requires less storage space in the instrument, and reduces the instrument's power consumption and memory size. In the preferred embodiment, 2048 entries are used to represent one full period.

Each entry in the sine table is preferably calculated prior to entry into the zoom processor 18, and stored in the memory 16 of the zoom processor 18 with sufficient precision to yield valid calculation results. The degree of precision to be used is also a tradeoff between competing interests. Using sine table values with too low a precision will result in excessive calculation error, while greater precision values require a greater amount of storage space, creating the space and power problems mentioned above. In the preferred embodiment, values with twenty-four bit precision are used.

While in an alternate embodiment a cosine table is also provided, in the preferred embodiment a sine table alone is used, and all cosine functions are calculated using the sine table and the equation $\cos(\theta)=\sin(\theta+\pi/2)$.

In this manner the additional space and power requirements for a second table are eliminated.

In a most preferred embodiment, the calculations used to shift the acquired signal 20 are further simplified so as to further reduce the calculation time required. The expression $(X+\Delta)/\Psi$ is substituted for $f_c/f_s$. This expression is then solved for X and $\Delta$, where X is a positive integer less than or equal to 800, and $\Delta$ is a non-negative number less than one. The value of $\Delta$ is determined with a high degree of precision to preserve the accuracy of the calculations. Preferably, $\Delta$ is calculated to the same precision as the values in the sine table, that being twenty-four bits.

In the preferred embodiment, the value of $\Psi$ in this substitution is chosen to match the number of values on which the full sine table is based. By so doing, the speed of the calculations is greatly increased in the following manner. The equation $f_c/f_s=(X+\Delta)/\Psi$ is solved using the constraints given above. For example, if $f_c$ equals 20 kHz, and $f_s$ equals 60 kHz, and $\Psi$ equals 2048, then X equals 682, and $\Delta$ equals approximately 0.66666667, but is calculated out to a precision of twenty-four bits.

The constraints used in the example above are as follows. The center frequency of the band of interest, $f_c$, is preferably between 30 Hz and 40 kHz. The value chosen in the example, 20 kHz, is approximately in the middle of the allowable frequency range of the preferred embodiment. The value of the band of interest is chosen to be 2 kHz. The sampling frequency, $f_s$, is preferably greater than the upper frequency, $f_u$, or 21 kHz, multiplied by 2.56.

Thus the minimum value of $f_s$ in this example is 53.76 kHz, and the value chosen, 60 kHz, is above the preferred minimum value. In the preferred embodiment, the value chosen for $f_s$ is the smallest among the $f_s$ settings available, which satisfies the condition $f_u<f_s/2.56$. There is another preferable constraint on the selection of $f_s$ as described more fully below.

Using these values for $f_c$ and $f_s$, X is calculated to equal 682.66666667, assuming for the moment that the value of Δ is zero. However, one of the constraints is that X is a positive integer less than or equal to 800, so X is either 682 or 683. Since another constraint is that Δ is a non-negative number less than one, the value of X is rounded down to 682. The value for Δ is the amount by which X was rounded down, or 0.66666667.

The benefit of doing the calculations in this manner is that if Δ is equal to zero, then the value of ηX represents the location of an entry in the sine table, the value of which provides the solution to the sine portion of the calculation. If ηX is greater than the number of entries in the sine table, then the proper entry is found by wrapping back around to the beginning of the sine table, in a continuous loop.

If Δ does not equal zero, then Δ is used as the interpolation value between the ηX and the η(X+1) entries in the sine table, to yield the proper solution. So in the example above, 0.66666667 is used to interpolate to the sine value between the 682 and the 683 entries in the sine table. This method of using an expression equal to $f_c/f_s$ to yield numbers which are entry pointers for a sine look-up table reduces the time required to perform the necessary calculations.

If in the above example a value of 64 kHz had been chosen for $f_s$, then X would have equaled 640 exactly, and Δ would have equaled zero. This would have eliminated the need to calculate Δ, and the need to interpolate between two values in the sine table. Thus, careful choice of the sampling frequency further reduces the time required for the calculations. In the preferred embodiment, if there exists a sampling frequency $f_s$, such that $f_u<f_s/2.56$ and Δ=0, then that $f_s$ is chosen as the sampling frequency.

Figure 2:
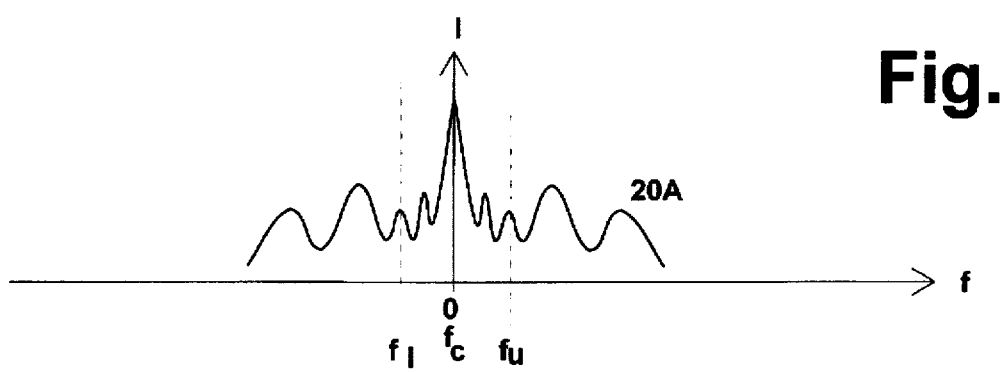
FIG. 2 is a plot of a frequency shifted signal showing frequency versus amplitude.

By use of the preferred embodiment of the method, the acquired signal 20 of FIG. 1 is shifted into the position depicted in FIG. 2 and a shifted signal 20A is produced. This step of shifting the signal is represented by the shift function 28 in the zoom processor 18 of FIG. 5.

The shifted signal 20A is low-pass filtered, such as by filter 30. In the preferred embodiment of the apparatus, sixth order elliptical filters are used for the low-pass filter operation, because of their speed and accuracy. The filters are implemented in software, and not in hardware, meaning that the processor 42 filters the signal 20A while it is being acquired, rather than having dedicated circuitry to filter the signal 20A.

While in an alternate embodiment the coefficients for an infinite number of filters are calculated as needed, in the preferred embodiment the coefficients for sixteen filters are pre-calculated and stored in memory, which provides a faster startup of the zoom processor. So as to maintain the accuracy of the various calculations throughout the processing of the signal 20, the coefficients for the filters are preferably calculated and stored with twenty-four bit precision, like the other values used in the calculations.

The width of the band of interest is entered via the interface 48. The zoom processor chooses a low-pass filter with the lowest cut-off frequency that is greater than one-half of the width of the band of interest. For example, if the width of the band of interest is selected to be two kHz, a low-pass filter with a value of one kHz is used, and if the width of the band of interest is selected to be eight kHz, a filter with a value of four kHz is used. In other words, the width of the frequency band created by a low-pass filter will be twice the value of the low-pass filter.

The low-pass filter operates in this manner because of the nature of the shifted signal 20A. As seen in FIG. 2, with the center frequency shifted to zero, a portion of the shifted signal 20A extends into a range of negative frequencies. The low-pass filter acts upon the negative frequencies in a way that is mirror-like to the positive frequencies. Thus while the low-pass filter passes only those positive frequencies which are lower than the value of the filter, it also passes those negative frequencies which are higher than the negative of the value of the filter.

It is this characteristic of low-pass filtering of negative frequencies which makes this method of zoom processing so efficient. By taking advantage of this characteristic, only low-pass filters are needed by the instrument. Low-pass filters with lower frequency values create narrower bands of frequency, and low-pass filters with higher frequency values create wider bands of frequency. By use of the shifting function described above, any frequency in the spectrum acquirable by the instrument can be used as the center frequency of the narrow spectrum band. And as low-pass filters require far less memory to store than do band-pass filters, a far greater selection of band widths is available.

Figure 3:
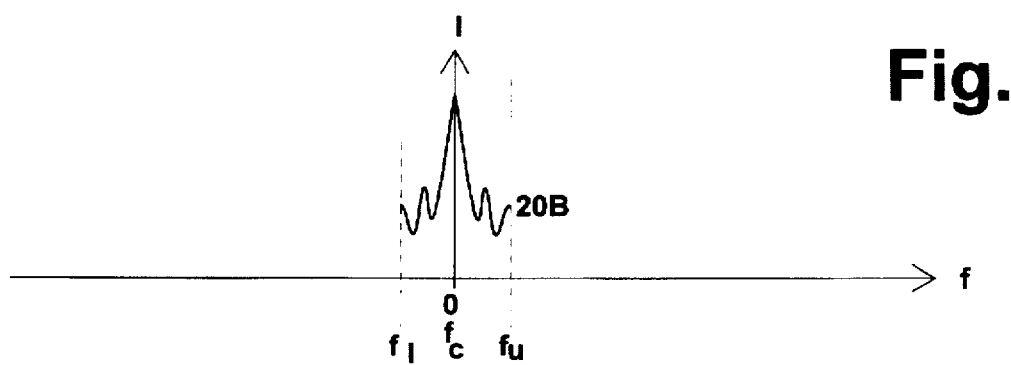
FIG. 3 is a plot of a low-pass filtered signal showing frequency versus amplitude.

After the signal 20A has been low-pass filtered, the resultant low-pass filtered signal 20B appears as depicted in FIG. 3. As seen, the low-pass filtered signal 20B is centered with $f_c$ at zero, and extends from a low of $f_l$, which is in the negative frequency band, to a high of $f_u$, which is in the positive frequency band.

In a preferred embodiment, the low-pass filtered signal 20B is decimated at the same time that it is filtered. However, to more clearly explain the method, the description of the two steps is separated so as to clearly set forth the important aspects of each step. A decimator 32 is depicted in FIG. 5.

Figure 4:
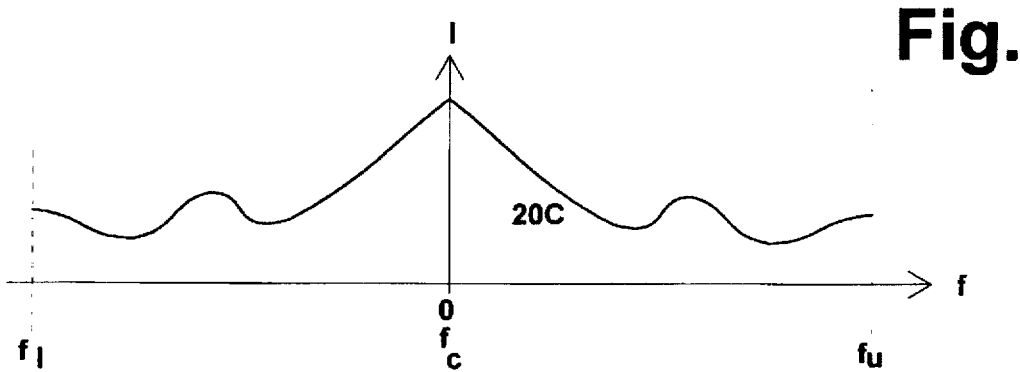
FIG. 4 is a plot of a decimated signal showing frequency versus amplitude.

Decimation of the low-pass filtered signal 20B by the sixth order low-pass elliptical filters leaves a predetermined number of data points intact in the time domain signal. For example, decimation by two leaves every other data point intact, and decimation by 500 leaves one out of every 500 data points intact in the low-pass filtered signal, which commensurately compresses the time domain signal. This decimation of the time domain signal results in a proportional expansion in the frequency domain of the decimated signal 20C, as depicted in FIG. 4, and provides a zoom in the narrow band spectrum. In the preferred embodiment, coefficients sufficient for sixteen decimation filters are programmed into the instrument, having decimation values between eight and 800.

A Fast Fourier Transform (FFT), or other transform, is performed on the decimated signal 20 to transform it from the time domain to the frequency domain, such as by the transformer 36.

The frequency domain decimated signal 20C is output as a zoom processed signal on an output device, which may be a physical connection to other components for a zoom processor 18 integrated into an instrument having other functions, or may include a display, storage, or printing device if the zoom processor 18 is more of a stand-alone device. If the zoom processor 18 is a part of a larger instrument, then any number or type of analyses may subsequently be performed on the zoom processed signal. This subsequent analysis is represented in FIG. 5 as signal analyzer circuit 38, the nature of which varies according to the design of the specific instrument in which the zoom method of the present invention is implemented.

The instrument functionally depicted in FIG. 5 also has a power supply 40, which in the preferred embodiment is a battery that supplies power to the components of the instrument on lines 44. The microprocessor 42 communicates with the components on lines 46. The elements 28, 30, 32, 36, and 38 are depicted in FIG. 5 as being a part of the memory 16 because they are preferably implemented in the memory 16 by the processor 42. The method of the present invention may be implemented in a small, hand-held, battery-powered, portable, microprocessor-based vibration analyzer having sufficient memory and processing capabilities, such as the CSI 2115, or the analyzer disclosed in co-pending application Ser. No. 08/355,208.

While preferred embodiments of the present invention are described above, it will be appreciated by those of ordinary skill in the art that the invention is capable of numerous modifications, rearrangements and substitutions of parts without departing from the spirit of the invention.

What is claimed is:

1. A method of zoom processing a time domain frequency signal digitized at a sampling frequency comprising:

providing a zoom processor having an input device, a memory, a processor, and an output device, acquiring the digitized time domain frequency signal with the input device of the zoom processor, to produce an acquired signal, lowering the frequency of the acquired signal with the processor of the zoom processor, by:

inputting a sine table into the zoom processor using the input device of the zoom processor, where the value of each entry in the sine table is based on one full period being represented by a predetermined number of entries, the entries being twenty-four bit numbers, storing the sine table in the memory of the zoom processor, solving the equation $f_c/f_s = (X+\Delta)/\Psi$ for X and $\Delta$ using the processor of the zoom processor, where X is a positive integer less than or equal to 800, $\Psi$ is the predetermined number, and $\Delta$ is a non-negative number less than one, selecting the $\eta X$ sine table entry using the processor of the zoom processor when $\Delta$ equals zero, the value of which entry equals $\sin[(2\pi)\eta(f_c/f_s)]$, interpolating by $\Delta$ between the $\eta X$ sine table entry and $\eta(X+1)$ sine table entry using the processor of the zoom processor, to determine an interpolated value when $\Delta$ does not equal zero, which interpolated value equals $\sin[(2\pi)\eta(f_c/f_s)]$, and calculating $\cos[(2\pi)\eta(f_c/f_s)]$ using the processor of the zoom processor according to the equation $\cos(\theta) = \sin(\theta + \pi/2)$, and multiplying the acquired signal by $\{\cos[(2\pi)\eta(f_c/f_s)] + j^*\sin[(2\pi)\eta(f_c/f_s)]\}$, where $\eta$ is a consecutive data point number, j is an imaginary number having a value of $(-1)^{1/2}$, $f_c$ is a frequency of the acquired signal, and $f_s$ is the sampling frequency used to produce the digitized time domain frequency signal, to produce a shifted signal, low-pass filtering the shifted signal, to produce a low-pass filtered signal, and outputting the low-pass filtered signal with the output device of the zoom processor, to produce a zoom processed signal.

2. The method of claim 1 wherein the predetermined number is 2048.

3. A method of shifting a digital frequency signal, that was digitized using a predetermined sampling frequency, comprising:

providing a signal shifter having an input device, a memory, a processor, and an output device, acquiring the digital frequency signal into the signal shifter using the input device of the signal shifter, to produce an acquired signal, selecting a frequency $f_c$ of the acquired signal using the input device of the signal shifter, selecting the predetermined sampling frequency using the signal shifter, storing the predetermined sampling frequency in the memory of the signal shifter, dividing the frequency $f_c$ of the acquired signal by the predetermined sampling frequency $f_s$, using the processor of the signal shifter, to produce a ratio $f_c/f_s$, setting the ratio $f_c/f_s$ equal to $(X+\alpha)/\Psi$ where X is a positive integer less than or equal to 800, $\Delta$ is a non-negative number less than one, and $\Psi$ is a predetermined number, solving the equation $f_c/f_s = (X+\Delta)/\Psi$ for X and $\Delta$ using the processor of the signal shifter, storing the values of X and $\Delta$ in the memory of the signal shifter, inputting a sine table into the signal shifter using the input device of the signal shifter, the sine table based on $\Psi$ entries representing one full period, storing the sine table in the memory of the signal shifter, calculating the solution of $\sin[(2\pi)\eta(f_c/f_s)]$, where $\eta$ is a consecutive data point number, with the processor of the signal shifter, by using the value of the $\eta X$ sine table entry as the solution if $\Delta$ equals zero, and by using the processor of the signal shifter to interpolate by $\Delta$ between the $\eta X$ and $\eta(X+1)$ entries if $\Delta$ does not equal zero, calculating the value of $\cos[(2\pi)\eta(f_c/f_s)]$, with the processor of the signal shifter, by using the identity $\cos(\theta) = \sin(\theta + \pi/2)$, multiplying the signal by $\{\cos[(2\pi)\eta(f_c/f_s)] + j^*\sin[(2\pi)\eta(f_c/f_s)]\}$, using the processor of the signal shifter, where j is an imaginary number having a value of $(-1)^{1/2}$, to shift the signal by $f_c$, such that $f_c$ is shifted to a frequency of zero, to produce a shifted signal, and outputting the shifted signal with the output device of the signal shifter.

4. A zoom processor for acting on a time domain frequency signal which has been digitized at a predetermined sampling frequency comprising:

an interface for;

inputting a value $f_c$ into the zoom processor, representing a frequency within the time domain frequency signal, inputting a sine table into the zoom processor, where the value of each entry in the sine table is based on one full period being represented by a predetermined number of entries, inputting low-pass filter parameters into the zoom processor, and inputting the predetermined sampling frequency $f_s$ into the zoom processor, a signal input device for receiving the time domain frequency signal into the zoom processor, and producing an acquired signal, a memory for;
  storing $f_c$,
  storing $f_s$,
  storing the sine table, and
  storing the low-pass filter parameters, a processor for;
  solving the equation $f_c/f_s=(X+\Delta)/\Psi$ for X and $\Delta$, where X is a positive integer less than or equal to 800, $\Psi$ is the predetermined number, and $\Delta$ is a non-negative number less than one, selecting the $\eta X$ sine table entry when $\Delta$ equals zero, the value of which sine table entry equals $\sin[(2\pi)\eta(f_c/f_s)]$, where $\eta$ is a consecutive data point number, interpolating by $\Delta$ between the $\eta X$ sine table entry and $\eta(X+1)$ sine table entry to determine an interpolated value when $\Delta$ does not equal zero, which interpolated value equals $\sin[(2\pi)\eta(f_c/f_s)]$, calculating $\cos[(2\pi)\eta(f_c/f_s)]$ by using the equation $\cos(\theta)=\sin(\theta+\pi/2)$, multiplying the acquired signal by $\{\cos[(2\pi)\eta(f_c/f_s)]+j*\sin[(2\pi)\eta(f_c/f_s)]\}$, where j is an imaginary number having a value of $(-1)^{1/2}$, to shift the acquired signal by $f_c$, and producing a shifted signal, and filtering the shifted signal using the low-pass filter parameters to pass a portion of the shifted signal extending from a low frequency of the negative of the value of the low-pass filter parameter, to a high frequency of the value of the low-pass filter parameter, and producing a low-pass filtered signal, centered at a frequency of zero, a signal output device for outputting the low-pass filtered signal, and a power supply for supplying power to the interface, input device, memory, processor, and output device.

5. The zoom processor of claim 4 further comprising the processor of the zoom processor for decimating the low-pass filtered signal using the low-pass filter parameters, and producing a decimated signal.

6. The zoom processor of claim 5 wherein the processor of the zoom processor decimates the low-pass filtered signal at a factor of between eight and 800.

7. The zoom processor of claim 4 wherein the parameters for sixteen low-pass filters are stored in the memory of the zoom processor.

8. The zoom processor of claim 4 wherein the predetermined value is 2048.

* * * * *